Figure 4:
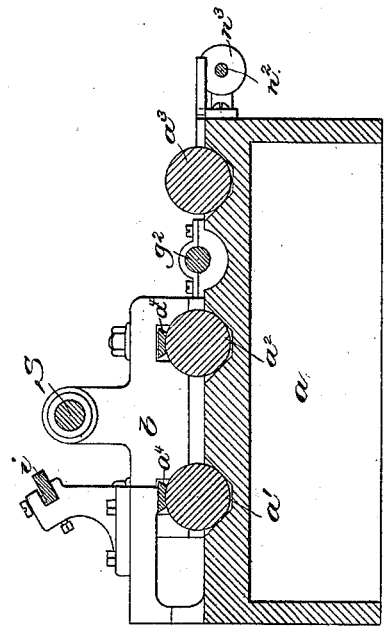

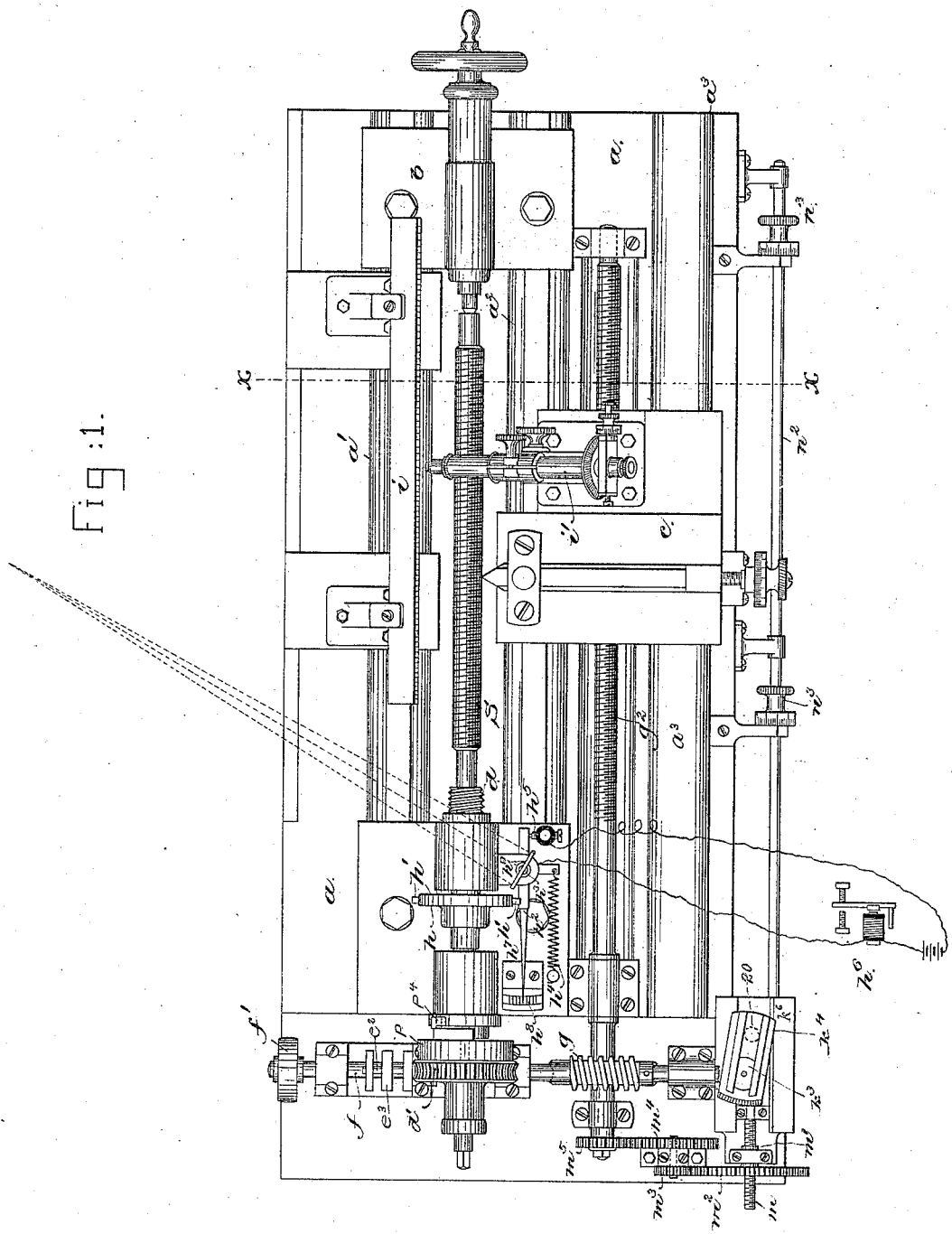

(No Model.) 3 Sheets—Sheet 2.
W. A. ROGERS & G. F. BALLOU.
APPARATUS FOR CUTTING SCREWS.
No. 301,165. Patented July 1, 1884.
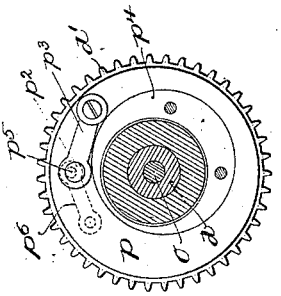
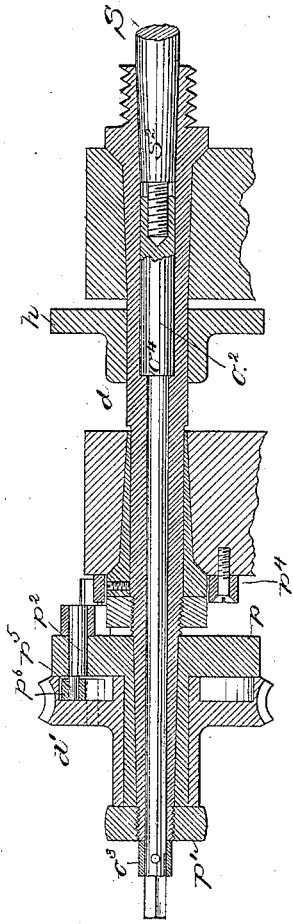
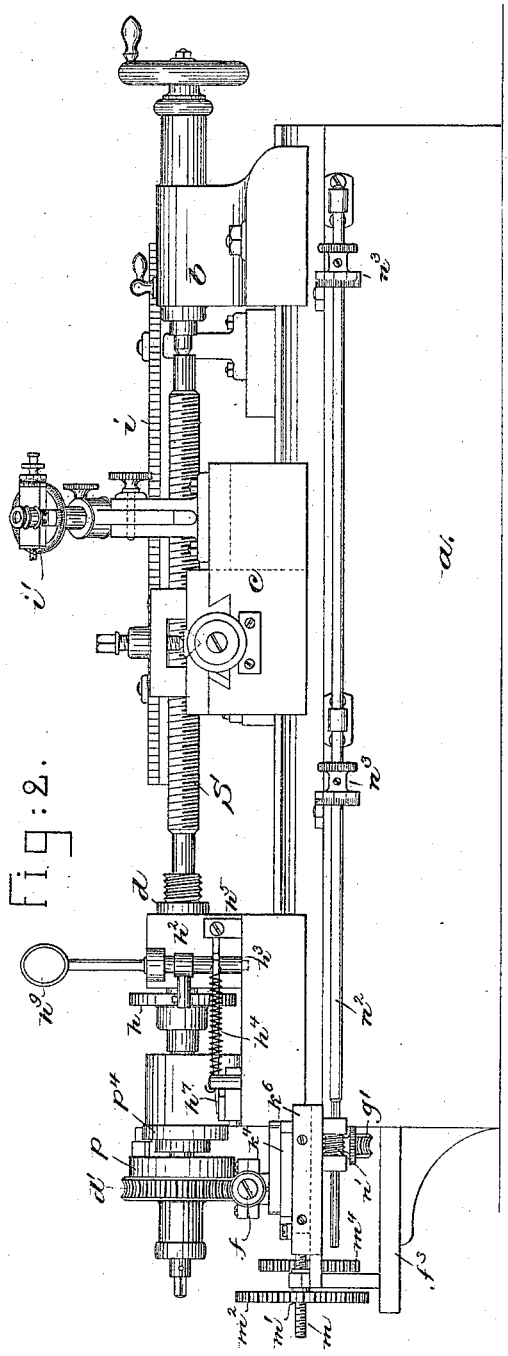

(No Model.) 3 Sheets—Sheet 3.

W. A. ROGERS & G. F. BALLOU.
APPARATUS FOR CUTTING SCREWS.

No. 301,165. Patented July 1, 1884.

Witnesses
Arthur Lippesten
John F. E. Trunkert

Inventor.
William A. Rogers and
George F. Ballou
by Crosby & Gregory attys.

N. PETERS. Photo-Lithographer, Washington, D. C.

UNITED STATES PATENT OFFICE.

WILLIAM A. ROGERS, OF CAMBRIDGE, AND GEORGE F. BALLOU, OF WALTHAM, MASSACHUSETTS.

APPARATUS FOR CUTTING SCREWS.

SPECIFICATION forming part of Letters Patent No. 301,165, dated July 1, 1884.

Application filed September 24, 1883. (No model.)

*To all whom it may concern:*

Be it known that we, WILLIAM A. ROGERS, of Cambridge, county of Middlesex, and GEORGE F. BALLOU, of Waltham, Middlesex county, State of Massachusetts, have invented an Improvement in Apparatus for Cutting Screws, of which the following description, in connection with the accompanying drawings, is a specification, like letters on the drawings representing like parts.

Our invention consists, mainly, in a mechanism for accomplishing the following objects:

First. To cut lathe or other screws to an exact standard of length, or so that the distance between the terminal convolutions of the screw-thread at the two ends, measured along any line parallel with the axes of the screws, shall be exactly equal to any equal multiple or to any equal subdivision of the imperial yard of Great Britain at the temperature of 62° Fahrenheit, or to any other standard of lineal measurement that may be desired. Screws of any required pitch, whether regular or irregular, may be cut to an exact standard of length.

Second. To produce screws which shall have a uniform pitch, not only for aliquot parts of a revolution or turn of the thread at any point, but also throughout the entire length of the screw.

It may be readily demonstrated that existing screws are far from accurate with respect to uniformity of pitch, and the error in the whole length at the standard temperature is often so great that a screw cut upon one lathe will not fit a nut cut upon a lathe by a different maker. The most serious errors found in existing lathe-screws belong to a class known as periodic errors, occurring in each turn of the thread, as follows: Starting at any point in the arc of revolution, the error in inclination or pitch of the thread increases by successive small increments until at a certain point a maximum value of the error is reached, and beyond this point the error gradually diminishes; but not usually at the same rate that it previously increased. Thus, though the error in the first one-hundredth of a revolution may be, for example, only one ten-thousandths of an inch, the error in one tenth of a revolution may, by successive increments, amount to as much as one one-thousandths of an inch, and the maximum error in one turn of the thread may reach one two-hundredths of an inch. Thus, though it may be difficult to detect the errors for small arcs of revolution, the accumulation of these small errors for half a revolution of the screw may become a very serious matter.

Hitherto the method most commonly employed to obtain uniformity in the pitch of screws consists in grinding with emery by means of a nut having a greater or less length; but it may be easily shown that the class of errors described as periodic cannot be removed by grinding. The errors in pitch at one part of the screw are simply distributed in a slightly different manner. This must necessarily be the case, since in grinding we deal with a combination of the threads of the nut and screw, and the said combination varies at every point in the rotation of one relatively to the other. In our process we deal with each single turn of the thread. Each turn of the thread is, by the process of cutting, made to represent the mean of all the threads in the screw for every part of the arc of revolution.

In order to cut screws in accordance with our invention with success the following conditions must be fulfilled:

(*a.*) The carriage which carries the cutting-tool must move in a plane parallel with the axis of the screw to be cut. If there is any flexure in the ways upon which it travels, this flexure must be neutralized by proper methods.

(*b.*) The cutting-tool must move in a line parallel with the axis of the screw to be cut. The ways must, therefore, have no curvature in their plane.

(*c.*) The screw to be cut must describe a true cylinder in its revolution, and not the frustums of two cones. The flexure of the rod upon which the thread is to be cut must therefore be neutralized.

In practice these preliminary conditions of success are fulfilled by methods of mechanical construction, which need not be fully described in this connection, it being assumed that the machine is accurate in these particulars, as such accuracy is within the range of mechanical construction.

In practicing our invention, as shown in this instance, we employ a screw-cutting lathe, the leading or tool-feeding screw of which may have greater or less inaccuracies, as is inevitable in screws made previous to our invention, the said feeding-screw and the spindle carrying the shaft to be threaded being connected by gearing, so as to normally have a definite relative rate of rotary movement, as is usual in screw-cutting lathes, and the said feeding-screw operating the carriage for the tool, by which the shaft or rod is cut or threaded in the usual manner.

The invention consists, partly, in the lathe having a tool-carriage and feeding mechanism therefor, combined with a standard linear scale or graduated bar fixed upon the lathe-bed, and a measuring device, shown in this instance as a microscope, carried by the said tool-carriage, whereby the distance traveled by the tool-carriage may be accurately and minutely observed from point to point, and the inaccuracies of its feeding movement thus determined throughout the entire length of the said movement. This shows the amount of correction necessary during the different parts of the movement of the tool-carriage; and the invention further consists in mechanism for so correcting irregularities of longitudinal movement of the tool in relation to the rotary movement of the spindle carrying the rod or shaft to be cut as to make the said relation constant.

The invention also consists in various details of construction hereinafter described, whereby the movements of the different parts are rendered more accurate.

Figure 3:
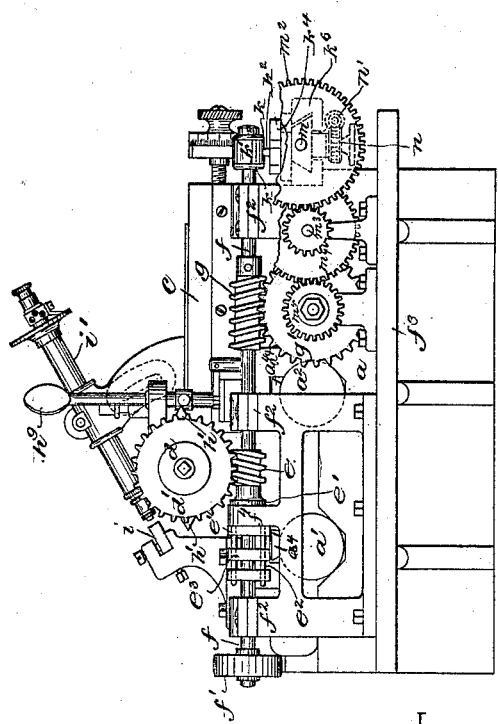

Figure 1 is a plan view of an apparatus for cutting screw-threads embodying this invention; Fig. 2, a front elevation, and Fig. 3 an end elevation, thereof; Fig. 4, a transverse section on line $x$, Fig. 1; Fig. 5, a longitudinal sectional detail of the spindle for revolving the shaft or rod being cut, and Fig. 6, a detail, to be referred to.

The lathe-bed $a$ may be of any suitable or usual construction, the ways $a'$ $a^2$ $a^3$, upon which the tail-stock $b$ and the tool-carriage $c$ travel, being preferably made as cylinders, for greater accuracy. The cylindrical ways $a'$ $a^2$, upon which the head and tail stocks of the lathe are mounted, are provided with longitudinal dovetail-shaped ribs $a^4$, (see Fig. 4,) rigidly fastened to them to facilitate the clamping or fastening of the said stocks upon the said ways.

The spindle $d$ of the head-stock, to which the shaft or rod S to be cut or threaded is fastened by any suitable clamp, dog, or chuck, preferably as hereinafter described, is provided with an actuating worm-gear, $d'$, meshing with a worm, $e$, mounted loosely on the driving-shaft $f$, provided with a pulley, $f'$, and mounted in bearings $f^2$ upon a shelf, $f^3$, at the head of the lathe-bed. The worm $e$ is provided with a grooved collar, $e'$, running in a bearing, $f^4$, which prevents any longitudinal movement of the said worm relative to the worm-gear $d'$ and spindle $d$, and the worm is provided with pins $e^2$, passing through sockets in a collar, $e^3$, fixed upon the shaft $f$, the said pins and collar operating as a spline to permit the said shaft to move longitudinally through the said worm, but causing both to have the same rotary movement. The shaft $f$ has fixed upon it a worm, $g$, engaging a worm-gear, $g'$, fixed upon the leading or feeding screw $g^2$, which engages and operates the tool-carriage $c$ in the usual manner. It will be understood that if the worms $e$ and $g$ are of equal pitch, and the worm-gears $d'$ and $g'$ are exactly equal, then the screw $g^2$ and shaft S will be revolved at exactly the same speed as long as the worms remain in the same relative position, or, in other words, as long as the shaft $f$ and worm $g'$, fixed thereto, have no longitudinal movement; but if the said shaft and worm be moved longitudinally by mechanism hereinafter described, the said movement will give a rotary movement to the gear $g'$ and screw $g^2$ independent of that produced by the rotary movement of the shaft and worm, and the said rotation produced by the longitudinal movement of the shaft $f$, and which may be called the correction, may be such as to increase or diminish the rotation of the screw $g^2$ relative to that of the shaft S, according to the direction of the longitudinal movement of the said shaft $f$.

The requisite for making a correct screw-thread on the shaft S is that for equal angular or rotary movements of the said shaft the tool shall be moved by the tool-carriage equal distances measured parallel with the axis of the shaft; and it will be seen that if there is no inaccuracy in the construction of the gears $d'$ $g'$ and worms $e$ $g$, and if no error arises in the connection between the gear $d'$ and shaft S, or between the gear $g'$ and screw $g^2$, or between the said screw and the cutting-tool, then if the screw $g^2$ itself were accurate, the desired relative movement would be imparted to the shaft S and cutting-tool, and a correct screw would be cut of the same pitch as the feeding-screw; or it might be of different pitch by varying the gears $d'$ and $g'$ and their respective worms. It is, however, impossible to find a correct screw made by previous methods, and consequently the first step toward making an accurate screw is to find and tabulate the errors in the feeding-screw $g^2$, or, in other words, in the longitudinal movement of the tool-carriage and tool relative to the rotary movement of the shaft S. Supposing, for example, it is required to cut a screw, the thread of which makes five hundred turns in one meter of length, or, as it is commonly called, "a screw of five hundred threads to one meter," then for each five rotations of the shaft S the tool should travel one centimeter, or for each one-half rotation a millimeter, and so on. The actual relative travel is determined as follows, it being supposed that the screw $g^2$ has five hundred threads to one meter, although they are not uniform:

In order to accurately measure the number of rotations of the shaft S, so as to compare its rotary movement with the longitudinal movement of the carriage $c$, the spindle $d$ is provided with a plate or disk, $h$, having one or more projections $h'$, according to whether it is desired to measure whole rotations or fractions thereof, it being shown in this instance as having two opposite projections to measure half-rotations. The said projections co-operate with an indicating device or gage, $h^2$, consisting of a lever pivoted at $h^3$, normally held in contact with an insulated stop, $h^5$, by a spring, $h^4$, the said lever and stop $h^5$ forming a key for the circuit of an electrical signal or sounder, $h^6$, which thus announces each time that the projection $h'$ engages and moves the said lever.

In order to determine the point for stopping the shaft S, so that it may be always stopped at exactly the same point, the lever $h^2$ has a long index-finger, $h^7$, which is moved by the action of the projection $h'$ over a graduated arc, $h^8$, so that the shaft may always be brought to rest when the said pointer has arrived at the same graduation on the scale or arc.

In order to further facilitate observation from any part of the lathe without approaching the index and arc, the stop-gage lever $h$ has connected with it a mirror, $h^9$, by which a reflected beam of light may be made to travel along a scale as the said lever is turned, it being used in substantially the same way as in the well-known galvanometer. The movement of the lathe will necessarily be very slow when frequent observations are to be made, and it will be hardly practicable to drive it by power; but it will be turned by hand, and the operator will be enabled, by the indicating devices or gages last described, to stop the shaft at exactly the same point in each rotation. The divisions of the scale are useful in finding the same point on the shaft with relation to the point of the cutting-tool in case the latter should be reset or ground before the operation is completed, in which case it might be found necessary to stop the shaft at another division of the indicating-scale.

Having determined exactly a number of complete revolutions or an exact fraction of a revolution of the shaft S, the next step is to measure the distance traveled by the tool-carriage under the influences of the screw $g^2$, which is accomplished by means of a linear measuring-bar, $i$, accurately graduated for linear measurements with the desired number of gradations to correspond with the distance to be traveled by the carriage in the different measured portions of the rotary movement of the shaft S. For example, the bar may be divided into centimeters and the shaft stopped at every fifth revolution, when the position of the carriage $c$ will be determined by a co-operating measuring device, which, for extreme accuracy, consists in this instance of a microscope, $i'$, having the usual cross-wires to definitely fix a line of vision, it being fixed upon the said carriage. The mechanism is set with the shaft S stopped at a definite point indicated by the gage $h^2$, and with the cross-wires of the microscope exactly on one division of the scale or bar, and the shaft is turned for five revolutions and an observation made through the microscope. If the cross-wires are on the proper division of the bar, it shows that the feeding-screw $g^2$ is of proper average pitch for the said portion of its length. If, however, as is usually the case, the cross-wires are not on the division, the amount of variation is observed and noted as an inaccuracy to be corrected in cutting that portion of the shaft S, and the screw $g^2$ will be turned by the operator independently of the shaft S until the cross-wires are brought exactly upon the division, after which the shaft S will be turned five more revolutions and another observation made as before and the result tabulated. In this manner the inaccuracies of the screw $g^2$ are determined throughout its entire length. For the sake of illustration it may be supposed that in the first division the carriage $c$ falls behind one one-hundredths of a millimeter, and in the second division it has gained one one-hundredths of a millimeter. This will show that during the first five rotations of the shaft S and the screw $g^2$ the latter will have to gain one two-hundredths of a revolution, and in the second five rotations it will have to lose an equal amount to make the proper correction in the travel of the tool-carriage. These corrections are made by causing the shafts $f$ to move longitudinally during its rotary movement by which the shaft S and screw $g^2$ are turned. The longitudinal movement of the shaft $f$ may be produced by various kinds of mechanism. As herein shown, the said shaft is provided near one end with collars $k$, engaging the ends of a sleeve, $k'$, in which the said shaft rotates freely, the sleeve being provided with a pin, $k^2$, entering a block, $k^3$, (see Fig. 1, where the sleeve and a portion of the shaft $f$ are broken away,) mounted in guides of a guide-plate, $k^4$, pivoted as shown in dotted lines at 20, Fig. 1, upon a carriage, $k^5$, movable in a longitudinal guide, $k^6$, fixed upon or forming part of the bed of the lathe. The said carriage is provided with feed-screw $m$, operated by a nut, $m'$, itself rotated by a suitable train of gearing, $m^2\ m^3\ m^4\ m^5$, from the shaft of the gear $g$, by which the feed-screw $g^2$ is actuated, the said gearing being such that the carriage $k^5$ is fed sufficiently to cause the block $k^3$ to travel the length of its guide during the feeding movement of the tool-carriage c along the lathe. Thus by setting the guide-plate $k^4$ at any desired angle to the guide $k^6$ the shaft $f$ may be caused to move a certain distance during the entire feeding-movement of the carriage c, thus varying the relative rate of motion of the shaft S and screw $g^2$ from that made by the simple rotation of the worms e and g. This permits an error extending throughout the entire length of the screw to be rectified automatically while the lathe is running at the usual speed, or a screw to be cut of slightly greater or less average pitch than that of the feeding-screw $g^2$, so as to bring the screw that is being cut to the desired standard of length, although the minor inaccuracies occurring at different points along the screw will not be corrected.

In order to turn the guide-plate $k^4$ on its pivot, it is provided with a worm-gear, n, below the carriage $k^5$, engaged by a worm, $n'$, splined upon the adjusting-shaft $n^2$, extending along the front of the lathe, and provided with any convenient number of graduated disks or handles $n^3$, by which it may be rotated to turn the guide-plate on its pivot, the said worm being free to travel longitudinally on the shaft $n^2$, to accommodate the longitudinal movement of the carriage $k^5$.

For correcting the minor inaccuracies which occur in the feeding-screw $g^2$ from point to point, the plate $k^4$ may be gradually turned by the operator, while the lathe is in operation, to produce the proper longitudinal movements in the shaft $f$, to make up for the said inaccuracies, and while removing or making the corrections for the said inaccuracies the gearing $m^2$ $m^3$ $m^4$ $m^5$ may be disconnected from the shaft of the screw $g^2$, so that the carriage $k^5$ will have no longitudinal movement while the corrections are being made, the plate $k^4$ merely operating as an arm to move the shaft $f$ endwise. By this mode of operating the thread is correctly cut from point to point of its length, and is consequently correct in its total length. It may in some cases be desirable, however, to first cut a screw of correct total length by means of the inclined guide-plate $k^4$, carriage $k^5$, and co-operating parts when operating automatically, as previously described, and then to use the screw thus cut to actuate the tool-carriage while cutting the screw for which corrections are made by hand from point to point throughout the entire length of the thread.

As herein shown, the spindle d of the head-stock of the lathe, for carrying the shaft S to be cut, is made hollow, and has a slightly-tapering socket in its end to receive the correspondingly-tapered end of the shaft S, as shown in Fig. 5, the said shaft having a small thread cut on it to be engaged by a threaded socket in a clamping-spindle, $o^2$, passing through the spindle d, and provided with a collar, $o^3$, engaging the rear end of the said hollow spindle d, and adapted to be rotated by a suitable wrench or key to draw the tapered end $s^2$ of the shaft S into its tapered socket in the spindle, thus securely fixing it in relation to the said spindle while being operated upon by the latter. The clamping-spindle $o^2$ has a shoulder, $o^4$, engaging a shoulder in the hollow spindle d, so that when the said clamping-spindle is turned in the opposite direction it will throw the shaft S out from the socket, so that it may be removed from the lathe.

It will be found that certain irregularities occur in the relative rotary movement of the shaft S and longitudinal movement of the tool-carriage c during each rotation of the said shaft, owing to some imperfection in the gearing or mechanical connection between the said shaft and tool-carriage other than the irregularities in the feeding-screw, which have before been referred to and provided for; and these irregularities in rotary movement may be determined by careful measurement of the longitudinal movement of the tool-carriage during the different fractions of several successive rotations of the shaft S. Thus in a series of measurements at various points in each rotation of a series of rotations it may be found that errors of the same character are repeated during the same part of each rotation, the angle of inclination of the thread being, for instance, too great in the first one-tenth of each turn of the thread measured from a given line along the side of the screw parallel with its axis, and the said angle being too small during the next one-fourth of each turn of the thread, and so on, although the amount of variation will not usually be equal in the different turns, but may be averaged. Such irregularities as are found repeated at the same part of each revolution are compensated for by the connecting mechanism between the spindle d and its actuating-gear $d'$, by which the movement imparted to the said spindle varies somewhat from that of the gear. As herein shown, the said spindle has fixed upon it a wrist-plate, p, shown as having a tapering socket pressed upon a corresponding taper on the spindle d by a nut, $p'$, the gear $d'$ being loose upon the hub of the said plate, which is provided with a pin, $p^2$, pivoted in the said plate, and having an arm, $p^3$, provided with a stud bearing upon a cam, $p^4$, shaped in accordance with the previously-observed irregularities in rotary movement of the gear $d'$ with relation to the longitudinal movement of the tool-carriage, the cam being fixed upon the head-stock. The pin $p^2$ is provided with an eccentric-stud, $p^5$, connected by a link, $p^6$, with the gear $d'$, so that as the said pin is partially rotated by the oscillation of the arm $p^3$ there is a slight rotary movement of the plate p and spindle d within the gear $d'$, which will compensate for the irregularities in the movement of the said gear. By fastening the shaft S to the spindle d by means of the tapering socket, the irregular strain that is derived from the usual face-plate and dog is avoided.

When necessary, the entire apparatus up to the level of the graduations on the bar $i$ may be immersed in a liquid such as oil, so as to maintain the graduated bar or standard $i$ and the shaft S at the same temperature, and if the said bar and shaft are of materials having different co-efficients of expansion, the said liquid will have to be kept at a uniform temperature while the cutting is taking place.

It will be seen that the accuracy of a screw-thread cut in accordance with this invention depends only upon the accuracy of rectilinear parts of the machine, and upon the accuracy of a standard of linear measurement, which points of construction are attainable in practice.

The essential novelty of the operation consists in compensating for unavoidable inaccuracies in existing machines while in the actual process of cutting each continuous portion of the thread, which is measured directly during the process of cutting. It follows that the screw can be made accurate to the highest degree that is capable of measurement.

We claim—

1. In a machine for cutting screws, the combination, with a carriage for the cutting-tool and mechanism to move it, of the stationary bar graduated to standard linear measurement, and a co-operating measuring device connected with the said carriage, whereby the actual linear movement of the tool-carriage may be accurately and minutely measured, substantially as and for the purpose described.

2. In a machine for cutting screws, the combination, with the spindle for the shaft to be threaded or cut and the tool-carriage, of mechanism for actuating the said spindle and carriage, and devices for indicating the exact amount of rotary movement of the said spindle, and measuring the corresponding movement of the said carriage, substantially as described.

3. In a machine for cutting screws, the combination of the spindle for the shaft to be threaded, and the tool-carriage and tool, with actuating mechanism common to the said spindle and carriage, and the mechanism, substantially as set forth, for correcting the effect of the said actuating mechanism upon the said spindle and tool-carriage from point to point, whereby they may be moved at a uniform relative rate, substantially as described.

4. The bed and head and tail stocks thereon, combined with the graduated bar fixed on the said bed, the tool-carriage having a linear movement on the said bed, and a microscope fixed on the said carriage and co-operating with the said bar, substantially as and for the purpose described.

5. In a machine for cutting screws, the movable tool-carriage and means to measure its movement, combined with the spindle for revolving the shaft to be threaded, the plate or disk fixed on the said spindle, and provided with projections, and the co-operating indicating device or gage forming a portion of an electric circuit, substantially as described.

6. In a machine for cutting screws, the movable tool-carriage, and means to measure its movement, combined with the spindle for revolving the shaft to be threaded, the plate or disk fixed on said spindle and provided with projections, and the co-operating indicating device or gage provided with an index-finger and co-operating graduations, substantially as and for the purpose described.

7. In a machine for cutting screws, the movable tool-carriage and means to measure its movement, combined with the spindle for revolving the shaft to be threaded, the plate or disk fixed on said spindle and provided with projections, and the co-operating indicating device or gage provided with a reflector whereby a reflected beam of light may be moved along a scale, substantially as and for the purpose described.

8. The spindle for rotating the shaft to be threaded, and the actuating-gear loose thereon, combined with connecting mechanism between the said gear and spindle, whereby their relative position is varied during their rotation, substantially as described.

9. The longitudinally-movable actuating-shaft and worms rotated thereby, one worm being movable with the shaft and the other having no longitudinal movement, combined with the gears actuated by the said worms, the sleeve on the said shaft, block, pivoted guide-plate, and mechanism for turning the said plate on its pivot, substantially as described.

10. The longitudinally-movable actuating shaft and worms rotated thereby, one worm being movable with the shaft and the other having no longitudinal movement, combined with the gears actuated by the said worms, the sleeve on the said shaft, block, guide-plate, carriage supporting the said plate, and means to impart to the said carriage a movement proportional to that of the tool-carriage, substantially as described.

In testimony whereof we have signed our names to this specification in the presence of two subscribing witnesses.

WM. A. ROGERS.
GEO. F. BALLOU.

Witnesses:
JOS. P. LIVERMORE.
W. H. SIGSTON.